(12) United States Patent
Grant

(10) Patent No.: US 6,955,297 B2
(45) Date of Patent: Oct. 18, 2005

(54) COORDINATE DESIGNATION INTERFACE

(76) Inventor: Isaac W. Grant, 3076 Via Alicante, Apt. K, La Jolla, CA (US) 92037

( * ) Notice: Subject to any disclaimer, the term of this patent is extended or adjusted under 35 U.S.C. 154(b) by 27 days.

(21) Appl. No.: 10/778,842

(22) Filed: Feb. 12, 2004

(65) Prior Publication Data

US 2005/0178838 A1    Aug. 18, 2005

(51) Int. Cl.$^7$ .............................................. G06K 7/10
(52) U.S. Cl. ............................ 235/462.08; 235/472.01
(58) Field of Search ..................... 235/462.01–462.45, 235/472.01, 472.02, 472.03, 375, 382.5, 235/454, 455, 456, 385, 469; 382/128, 133; 283/117, 101

(56) References Cited

U.S. PATENT DOCUMENTS

| | | | | |
|---|---|---|---|---|
| 3,513,320 | A * | 5/1970 | Weldon ....................... | 250/548 |
| 3,745,037 | A * | 7/1973 | Bowker ......................... | 427/8 |
| 4,621,434 | A | 11/1986 | Hirschmann | |
| 5,180,192 | A * | 1/1993 | Herbert ....................... | 283/101 |
| 5,270,820 | A * | 12/1993 | Fellinger .................... | 348/586 |
| 5,457,307 | A * | 10/1995 | Dumont ...................... | 235/383 |
| 5,530,207 | A | 6/1996 | Dolling | |
| 5,544,254 | A | 8/1996 | Hartley et al. | |
| 5,767,842 | A | 6/1998 | Korth | |
| 6,043,805 | A | 3/2000 | Hsieh | |
| 6,134,506 | A | 10/2000 | Rosenberg et al. | |
| 6,266,048 | B1 | 7/2001 | Carau, Sr. | |
| 6,281,878 | B1 | 8/2001 | Montellese | |
| 6,424,334 | B1 | 7/2002 | Zimmerman et al. | |
| 6,512,838 | B1 | 1/2003 | Rafii et al. | |
| 6,633,671 | B2 | 10/2003 | Munich et al. | |
| 6,662,036 | B2 * | 12/2003 | Cosman ....................... | 600/411 |
| 6,800,249 | B2 * | 10/2004 | de la Torre-Bueno ......... | 422/63 |
| 2002/0145038 | A1 * | 10/2002 | O'Hagan et al. ............ | 235/383 |
| 2003/0062419 | A1 * | 4/2003 | Ehrhart et al. .............. | 235/469 |
| 2003/0127519 | A1 * | 7/2003 | Ehrhart et al. .............. | 235/469 |
| 2004/0258280 | A1 * | 12/2004 | Merry et al. ................. | 382/115 |

* cited by examiner

Primary Examiner—Thien M. Le
(74) Attorney, Agent, or Firm—Donn K. Harms

(57) ABSTRACT

The present invention contemplates a novel method and device that combines one of more coordinate scanners which can digitize and communicate to a computer the exact location of the placement of a pointer on any designated surface and perform a variety of preprogrammed responses. More specifically, the invention relates to the methods and apparatuses used to identify specific points of indicia on a surface in front of the scanner. This surface is identified to a computer by identifying indicia such as a bar code or other manner of specifically identifying the surface. The computer will perform preprogrammed designated audio or visual or other electronic responses to identified points on the surface by matching the identified point on the surface with an electronic version of the surface in memory and a preprogrammed task for such a match. The designated surface may be flat or it may consist of a contoured surface in a wide variety of sizes and materials.

18 Claims, 1 Drawing Sheet

COORDINATE DESIGNATION INTERFACE

FIELD OF THE INVENTION

The invention relates generally to an interface for generating commands to electronic systems including computer systems and deriving a preprogrammed response. More specifically, the invention relates to the methods and apparatuses enabling a user to easily identify a specific point on a designated surface which is itself identified to a data processor by the means of a surface applied means for identification such as a bar code, serial number, optical character recognition of indicia, or other such means to identify the surface. Preprogrammed designated responses to a user choosing a designated point on the surface are derived from matching the designated surface having the surface identifier to a digitized rendition of the surface in computer memory. The designated surface may consist of a flat surface or it may consist of a contoured surface and be in a wide variety of sizes and materials.

BACKGROUND OF THE INVENTION

Computer systems that receive and process input data are well known in the art. Typically such systems include a central processing unit (CPU), persistent read only memory (ROM), random access memory (RAM), at least one bus interconnecting the CPU, the memory, and at least one input port to which a device is coupled for input data and commands, and output ports to which a monitor and speakers are connected to display results. Traditional techniques for inputting data have included use of a keyboard, mouse, joystick, remote control device, electronic pen, touch panel, pad or display screen, switches and knobs, and more recently handwriting recognition and voice recognition devices. However, such input devices are ill designed to work in combination with indicia and surfaces which users may be using and on which they may require additional information.

Computer systems and computer type systems have recently found their way into a new generation of electronic devices including interactive TV, toys for both education and entertainment, books, magazines, electronic cash registers, synthetic music generators, handheld portable devices including personal digital assistants (PDA), and wireless telephones. Consequently, conventional input methods and devices are not always appropriate or convenient when used with such systems.

This invention offers the unique capability, without a physical keyboard or mouse, of allowing the user to be able to point with an implement, or in some cases a finger, to any point on an identified surface and have the coordinate designator, which in this application is more generally called a scanner, transfer the coordinates designated into the computer to be matched with a virtual copy of the surface and thereafter generate an action by the computer based on the indicia the computer determines is located at the designated coordinate. While the term scanner is used throughout this application to describe a means to electronically image the surface being employed by the user and match that electronic image with a memory resident surface, such devices could include sonic devices which determine a designated coordinate using sound from one or a plurality of sources, laser scanners, CCD (Charge Couple Devices), camera-based readers to optically digitize the selected surface, and a host of other devices that could be used to both scan the surface and scan the surface identifier to determine the matching memorized surface to the surface being used.

The designated coordinate by the user is identified and matched to the designated coordinate in a memory resident preprogrammed substantially similar virtual surface which identifies the indicia located at the coordinate chosen by the user. Software then activates a preprogrammed action or a function associated or programmed for response to the designation of the point or surface area on the identified surface. This action can be an execution of any computer program, looking up information on the identified indicia in memory or on the internet, playing video, initiating speakers to pronounce the word or indica identified, or availing an infinite number of other informational media for the user.

Identification of the designated surface being used is made by placing identification indicia on the surface in front of the scanner such as an identification bar code or letter code or other means to identify the surface viewed by the scanner to the computing device operatively communicating with the scanner. At startup, the scanner finds the identification indicia, transfers that information to the computer which then matches the identification indicia to a memory resident preprogrammed designated surface programmed in the computer. The memory resident surface identifies to the computer and software therein each point on the identified surface and the indicia which resides at that given point. Consequently, the user, by placing a finger or other pointer at any point on the identified surface, causes the computer and software to identify the indica located at that point and to take some action in relation to the identified indica for the user.

REFERENCES CITED

U.S. Pat. No. 6,512,838 of Rafii et .al. Jan. 28, 2003 shows a 3-D sensor 20 that senses where the-user's fingers are on the template.

U.S. Pat. No. 6,134,506 of Rosenberg et al. Oct. 17, 2000 shows a device for measuring a three-dimensional surface for input to a computer model.

U.S. Pat. No. 6,266,048 of Carau, Sr. Jul. 24, 2001 shows an improved Personal Data Assistant that employs a single virtual keyboard in combination therewith for data input.

U.S. Pat. No. 6,043,805 of Hsieh Mar. 28, 2000 shows a coordinate sensor located on top of a computer monitor.

U.S. Pat. No. 6,424,334 of Zimmerman et al. Jul. 23, 2002 shows a computer data entry and manipulation apparatus and method using virtual reality.

U.S. Pat. No. 6,281,878 of Montellese Aug. 28, 2001 shows an apparatus and method for inputting data.

U.S. Pat. No. 6,115,128 of Vann Sep. 5, 2000 shows a multi-dimensional position sensor using range detectors.

U.S. Pat. No. 5,544,254 of Hartley et al. Aug. 5, 1996 shows a system wherein the image is digitized to a computer. The system also has a template and camera.

U.S. Pat. No. 4,623,434 of Hirschmann Nov. 11, 1986 shows a multiple coordinate scanner.

U.S. Pat. No. 6,633,671 of Munich et al. Oct. 14, 2003 shows a camera based handwriting tracker wherein the most likely position of the pen is taken by detecting the position of maximum correlation obtained by correlating the pen tip template Col. 2, Line 4.

U.S. Pat. No. 5,767,842 of Korth Jun. 16, 1998 shows a system having an optical input of commands or data.

U.S. Pat. No. 5,530,207 of Dolling Jun. 25, 1996 shows an apparatus includes a template which is displaceable over the drawing surface wherein the drawing aid is connected to a data receiving machine.

None of the prior art provides applicant's unique device which provides great utility to the user to ascertain more information or feedback about indicia located at a given point on an identified surface placed in front of the scanner. Neither do these previous efforts provide the benefits attendant with the present invention. The present invention achieves its intended purposes, objects and advantages over the prior art devices through a new, useful and unobvious combination of method steps and component elements, with the use of a minimum number of functioning parts, at a reasonable cost to manufacture, and by employing readily available materials.

In this respect, before explaining at least one embodiment of the invention in detail it is to be understood that the invention is not limited in its application to the details of construction and to the arrangement, of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for designing of other structures, methods and systems for carrying out the several purposes of the present invention. It is important, therefore, that the claims be regarded as including such equivalent construction insofar as they do not depart from the spirit and scope of the present invention.

SUMMARY OF THE INVENTION

The present invention contemplates a novel method and device that combines one or more means for determining designated individual coordinates on a surface which can digitize and communicate to a computer the exact location of the placement of an implement on the identified surface. Once the surface is so identified, and the coordinate chosen by the user is ascertained, the disclosed device will perform an infinite variety of preprogrammed feedback responses based on the indicia located at that location identified by the user.

The recognizing process can be achieved by using an already existing devices employed as a means to identify a surface and coordinates on that surface designated by a user. For ease of description this application employs the term coordinate scanner; however, the term scanner should be considered broadly as any means to view any identifiable surface placed in its view and digitize coordinates on that surface identified by the user as a designated point which is then transmitted to a computing means for further reaction based on the designated coordinate. Such means for scanning include but are not limited to such devices which could include light emitting diodes or lasers coupled reflecting the surface to a charge coupled device (CCD), binaural technologies which employ one or a plurality of sonic devices using sound from one or a plurality of sources to thereby determine user identified coordinates, camera-based readers to optically digitize the identified surface, and a host of other devices that could be used to both scan the surface and scan the surface identifier to determine the matching memorized surface to the surface being used. Of course those skilled in the art will no doubt realize that any number of different means to scan the identified surface to ascertain user identified coordinates may be used and all such devices are considered within the scope of this application.

This device can read and transfer the coordinates of a moving object on a given surface with predefined and limited boundaries. The coordinate scanner is connected to a computing means such as a computer using a means of electronic communication such as a wire or a wireless connection.

The coordinate scanner continually monitors the surface identified and in its view and will transfer the coordinates into the computer of any point designated by the user. Once a point designation is determined the designated point on the identified surface is compared with memory resident copies of the identified surface to determine the exact indicia located at the designated point. When the indicia at the designated point is identified, software will then activate a pre-defined action or a function designed for the marked point in the given designated surface. This action can be an execution of any computer program so that any desired action can be triggered by touching or moving a pointer to a given point on the designated surface. Or, some form of communication or mechanical action might be initiated based on the indicia located at the designated point.

The disclosed device has the unique capabilities of turning a designated surface into a linked surface within a technical device such as a computer by the means of using one or more coordinate scanners. These devices can read and transfer the coordinates of the designated surface in conjunction with a variety of pointers, such as any form of implement including a finger as it is placed on a given point on the designated surface. The idea is to be able to point with an implement on any marked point on a designated surface and have the coordinate scanner transfer the coordinates into the computer, which will then be identified and matched to a preprogrammed similar surface and will thus activate a preprogrammed action or a function designated for the marked point on the identified surface. The coordinate scanner can be connected to the computer through a wire or a wireless connection.

To identify the surface placed in front of the scanner, the device uses a means for identification of the surface in the form of a bar code, letter or number code, picture, or some other means for identifying the surface and matching it to a preprogramed identical surface which is memory resident. Also a preferred means to identify a surface bearing printed word indicia, such as a book, would be selective OCR where the device would scan a plurality of positioned words on the page such as in the four corners of the text. The four words would then be identified in their positions offering a means to identify the individual pages since it would be rare that any two pages would have the same four words in the same four positions. The coordinates on the preprogrammed surface are capable of a variety of responses such as giving the definition of a word, or the word in a different language. This action can be an execution of any computer program along with the responses being audio or displayed on a monitor.

A major element of this invention is that the designated surfaces may be a very wide range of sizes and shapes, which would include books, magazines, newspapers, templates, and even contoured surfaces, as long as there is a means for surface identification which can be communicated to a computing device and matched to a virtual equivalent surface which has been placed in computer memory. The surface to be scanned might also be virtual itself or in the form of, a projection which includes the surface identifier to identify it to the scanner and the communicating computer.

The coordinate scanners may be stationary but also may be portable devices that can be attached to books or magazines or templates or used in many different environments.

In use with a paper template such as that used by a child learning to read or learning to associate indicia in the form of pictures with some information about the picture, the template would be placed in a position in front of the scanner. At that point the bar code identification or some other means to identify the individual surface in front of the scanner would read. The surface identifier information as to what designated surface is being used would be communicated to a computer which would then identify which surface stored in memory matches the identified surface and thereafter the exact coordinates of the various indicia, boxes, pictures, words, etc. that are on that identified surface.

The user would then take a means for point designation such as a pen or stylus in hand and the movement of the pen or stylus would be tracked to its exact coordinates on the clipboard and concurrently on the designated surface. In use on a book, or magazine, or tabletop, a means to trigger that a point has been identified by the user would signal the computer to read the coordinates communicated by the scanners. In most cases the trigger can be a function of time with software determining that the user has placed the point designation means on a coordinate for a period of time equal to or greater than a predetermined time period which would trigger the computer to determine the coordinates being transmitted by the scanners for the time period and determine the exact point on the identified surface being designated by the user. These coordinates would be continually fed into the computer and when the stylus is placed on indicia at specific coordinates, the coordinate scanner would see this placement and communicate it to the computer. By comparing the coordinates detected, with the pre-stored placement of coordinates on the designated surface, actions can be initiated, by simply placing the stylus on the designated surface for a sufficient period of time to trigger the next action by the computer.

The device could thus be of great utility as a teaching aid with the coordinates of every word of a paragraph or page on the surface viewed, such as a book or magazine, being stored in the computer and the words, drawings, or other indicia becoming hyper text. Such hyper text would either be hard hyper text with the actual words when designated doing a "look up" in the computer for a definition or other association, or the words or indicia could be soft hyper text where the word or indicia being designated by the user for more information would be processed through a computer with a link to the Internet with the computer performing a search for the term or indicia and providing the results to the user. A child learning to read and having trouble with an individual word on any page of a book would designate the word by placing a pointer on it and the word could be pronounced by audio software, defined by a computerized dictionary, or information would be displayed on a screen from web sites about the word, or definitions of the word displayed, or some other action taken when the user places a stylus on one a word or other indicia that is detected by the coordinate scanners as being identified for further action.

In the case of books or magazines, the device would be especially useful since the normal books used by students would need only be scanned into the computer and the individual pages marked with a page identifier. Then the student would be able to read the book with the scanner watching and waiting for the student to identify any word or picture on any individual page and cause the computer to take the additional teaching or informational output action for the student.

Drawings and cartoons might be on the designated surface for children to look at and noises or other actions would occur when the child touches a picture with the stylus and the computer compares the coordinates of the touch with the coordinates of drawings or cartoons that are in that spot.

Essentially, by using a coordinate scanner to track the placement of the stylus to any point on any designated surface that has a surface identifier and has been put into computer memory, the device can function as a multitude of components depending on what is printed on the designated surface and stored in the computer for actions that occur when the coordinates of the designated surface are touched by the stylus.

As noted above, instead of using books or templates the designated surface itself might be virtual or projected on the grid being monitored by the coordinate scanner. As long as a surface identifier is projected along with the virtual surface, the scanners would identify the surface at any points designated by the user viewing it. This way a wall or blackboard could have the grid projected on it, being the designated surface, and the finger of a person touching the wall at a certain coordinate would cause the computer to perform a prerecorded action when that point is touched.

However, the actual or virtual designated surface with coordinates stored in the computer associated with actions when touched by the stylus is the current best mode. The use of the device is as broad as the number of designated surfaces with bar codes or other means for surface identification to the computer that can be pre-made and input into the computer to initiate actions when touched at certain coordinates by the stylus.

The foregoing has outlined rather broadly the more pertinent and important features of the present invention in order that the detailed description of the invention that follows may be better understood so that the present contribution to the art may be more fully appreciated. Additional features of the invention will be described hereinafter which form the subject of the claims of the invention. It should be appreciated by those skilled in the art that the conception and the disclosed specific embodiment may be readily utilized as a basis for modifying or designing other structures and methods for carrying out the same purposes of the present invention. It should also be realized by those skilled in the art that such equivalent constructions and methods do not depart from the spirit and scope of the invention as set forth in the appended claims.

In this respect, before explaining at least one embodiment of the invention in detail, it is to be understood that the invention is not limited in its application to the details of construction and to the arrangement of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

THE OBJECTS OF THE INVENTION

It is therefore an object of the present invention to identify specific points on any surface with a surface identifier and perform preprogrammed operations associated with the identified point.

It is another object of this invention to locate specific points on a designated surface by using any designating device including your finger, and communicate that information to a computer.

It is another object of this invention to locate specific points on a designated surface by the means of using two or more coordinate scanners.

It is still another object of this invention to locate specific points on a designated contoured surface by the means of using two or more coordinate scanners.

It is a further object of this invention to identify the designated surface being viewed by means for scanable identification of the surface such as a bar code or number code or grid code placed on the surface.

An even further object of the invention is having the designated surface preprogrammed into a computer for the purpose of coordinate identification and the initiation of the effective response.

Even still another object of the invention is to simplify the reading and translation of documents.

Lastly, it is an object of the present invention to increase the capabilities of computers through this unique combination of a coordinate scanner interface to initiate a visual or auditory response to the user based on user identified points on a surface.

The foregoing has outlined some of the more pertinent objects of the invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

The accompanying drawings, which are incorporated in and form a part of this specification, illustrate embodiments of the invention and together with the detailed description, serve to explain the principles of this invention.

Figure 1:
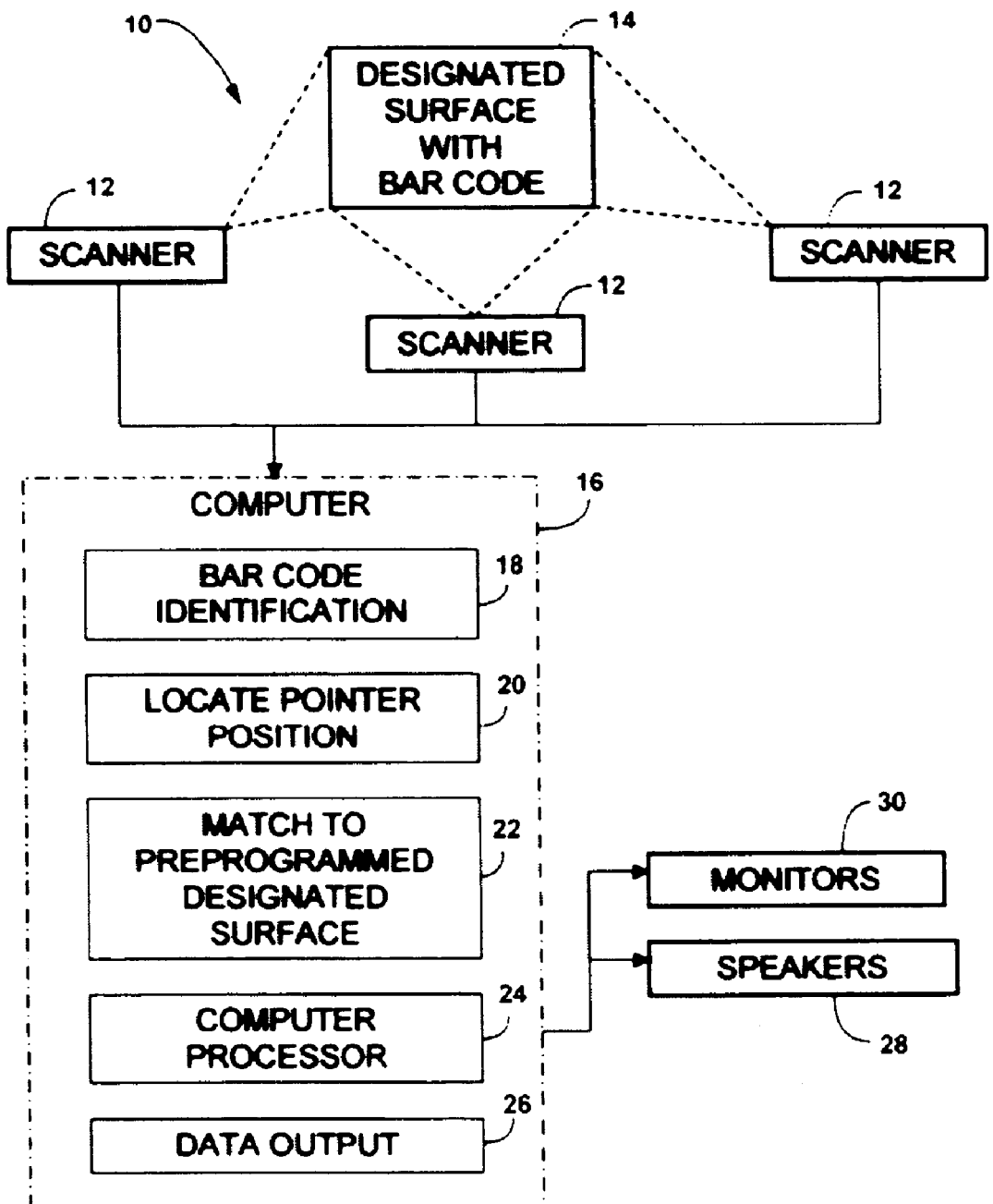
FIG. 1 depicts a block diagram illustrating the specific components of the coordinate scanner interface providing a computerized response to user identified points on a surface.

For a fuller understanding of the nature and objects of the invention, reference should be had to the following detailed description taken in conjunction with the accompanying drawings which are incorporated in and from a part of this specification, illustrate embodiments of the invention and together with the description, serve to explain the principles of this invention.

DETAILED DESCRIPTION OF THE PREFERRED EMBODIMENTS

Referring now to the drawings, wherein similar parts of the invention are identified by like reference numerals, there is seen in FIG. 1 a block diagram of the coordinate scanner interface 10 that combines one of more means for scanning an identified surface noted above and herein designated as coordinate scanner 12. The coordinate scanner 12 continually scans the surface placed in a registered engagement in its viewing proximity. The surface can be any of the aforementioned surfaces bearing indicia or can be a contoured surface so long as the surface being used employs a means to identify the specific surface being used such as surface identifying indicia shown currently as bar code 14. While the bar code 14 or some other type of optically recognizable code is used in the current preferred mode of the device, those skilled in the art will no doubt realize that other means to identify the surface to a computer to allow matching to a memory resident surface can be used and such are anticipated.

The scanners or scanner 12 viewing the page in their field of vision digitize and communicate to a computer 16 the exact location on a grid or by pixels or other means for determining an exact point on a surface in front of them, of the placement of the pointer on the identified surface. Once the computer 16 receives the information on the point identified by the user, using onboard software the computer 16 enables an infinite variety of preprogrammed auditory, visual, or other responses. The pointer may be as noted earlier a stylus, a finger, a pen, or any of a multitude of devices for identifying a specific point on an identifiable surface in front of the scanner 12 where indicia or another point of user interest resides.

The computer 16 using onboard software which analyses the digitized image communicated to it will first identify the exact surface placed in front of the scanner 12 using the chosen means to identify the specific surface in front of the scanner in the form of identifying indicia or other means of specifically identifying the surface including but not limited to a number code, grid code, or bar code identification, 18 as shown. As noted above, selective OCR could also be used where text indicia in a plurality of specific positions would be identified to identify the page individually. Or, the surface might be self-identified by the user entering keystrokes or placing the pointer on certain points on the surface which are designated to cause the computer to know what surface is in front of it. This manner of identification, while not as user friendly, would allow for a strictly sonic or binaural scanning of the surface for positioning of the pointer.

Once the surface is so identified, whenever the user moves the locate the pointer position 20, and the computer determines that a trigger to identify the coordinate has been initiated, a match to preprogrammed memory copy of the designated surface 22, using the computer processor 24 and software is made to determine the exact indica or other item located at the point identified. The trigger as noted above can be simply a function of time with the pointer placed at the designated position for a certain amount of time indicating to the computer that a point has been identified. Other means to designate and trigger an identification of a specific point on the page has been identified might be used such as magnetic templates, lights, a user activated foot or hand switch, or a microphone to pick up a tap sound. However, a time delay would currently offer the broadest use of the device since the user would only need to place a finger or pencil or the like on a word or other indicia for a determined amount of time to signal that the indica is to be identified to the computer.

Once the point identified by the user has been determined, the computer identifies from memory the indica located at the designated point. The indicia at the designated point, as noted above can function as actual hyper text in the case of text being the identified indica triggering a look up of the definition or the actual sound of the word so identified. Or the indicia might function as soft hyper text initiating the computer to search the Internet for definitions or information related to the identified indica at the designated point. As such, from a single input designation by the user of a specific point on the identified surface in front of the scanner, any number of outputs from the computer may be initiated where the computer outputs data 26 to the speakers 28 and monitor 30 or both or takes some other action based on the point on the surface the user has identified through the scanner.

While all of the fundamental characteristics and features of the disclosed device have been described herein, with reference to particular embodiments thereof, a latitude of modification, various changes and substitutions are intended in the foregoing disclosure and it will be apparent that in some instance, some features of the invention will be employed without a corresponding use of other features without departing from the scope of the invention as set forth. It should be understood that such substitutions, modifications, and variations may be made by those skilled in the art without departing from the spirit or scope of the invention. Consequently, all such modifications and variations are included within the scope of the invention as defined herein.

Further, the purpose of the herein disclosed abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

What is claimed is:

1. A surface scanning system for performing designated: actions from points identified on a surface comprising:
    a surface;
    means to identify said surface to a computer having an electronic copy of said surface stored in memory;
    means to scan said surface in electronic communication with said computer;
    means to identify a specific point on said surface in view of said means to scan said surface;
    means to trigger said means to scan said surface, to communicate said specific point identified by said means to identify a specific point, to said computer;
    software resident in said computer to compare said specific point identified to specific points on said electronic copy of said surface and thereby identify designated indicia located at said specific point; and
    said software upon determining said designated indicia, thereafter communicating to said user additional information relating to said designated indicia using electronic means for output of said additional information to said user.

2. The surface scanning system of claim 1 wherein said electronic means for output of said additional information comprises a video display of additional information.

3. The surface scanning system of claim 1 wherein said electronic means for output of said additional information comprises audio information communicated over at least one loudspeaker.

4. The surface scanning system of claim 2 wherein said electronic means for output of said additional information additionally comprises audio information communicated over at least one loudspeaker.

5. The surface scanning system of claim 2 additionally comprising:
    said software looking memory resident definition information of a specific word or picture identified as said specific indicia; and
    said software causing said video display to display said definition information on said video display.

6. The surface scanning system of claim 2 additionally comprising:
    said software performing an internet search using a specific word or picture identified as said specific indicia; and
    said software causing said video display to display results of said search as hypertext for further action by a user.

7. The surface scanning system of claim 1 additionally comprising:
    said surface being a template from a kit of interchangeable surface templates; and
    said means to identify said surface to a computer comprising indicia placed on said surface which when transmitted by said scanner to said computer is matched to one of a plurality of memory resident electronic renditions of said surface templates.

8. The surface scanning system of claim 2 additionally comprising:
    said surface being a template from a kit of interchangeable surface templates; and
    said means to identify said surface to a computer comprising indicia placed on said surface which when transmitted by said scanner to said computer is matched to one of a plurality of memory resident electronic renditions of said surface templates.

9. The surface scanning system of claim 5 additionally comprising:
    said surface being a template from a kit of interchangeable surface templates; and
    said means to identify said surface to a computer comprising indicia placed on said surface which when transmitted by said scanner to said computer is matched to one of a plurality of memory resident electronic renditions of said surface templates.

10. The surface scanning system of claim 6 additionally comprising:
    said surface being a template from a kit of interchangeable surface templates; and
    said means to identify said surface to a computer comprising indicia placed on said surface which when transmitted by said scanner to said computer is matched to one of a plurality of memory resident electronic renditions of said surface templates.

11. The surface scanning system of claim 1 additionally comprising:
    said surface being one of a group of indicia bearing surfaces including a book, a newspaper, and a magazine; and
    said means to identify said surface to a computer comprising indicia placed on pages of said book, said indicia which when transmitted by said scanner to said computer is matched to one of memory resident electronic renditions of said pages.

12. The surface scanning system of claim 2 additionally comprising:
    said surface being one of a group of indicia bearing surfaces including a book, a newspaper, and a magazine; and
    said means to identify said surface to a computer comprising indicia placed on pages of said book, said indicia which when transmitted by said scanner to said computer is matched to one of memory resident electronic renditions of said pages.

13. The surface scanning system of claim 3 additionally comprising:

said surface being one of a group of indica bearing surfaces including a book, a newspaper, and a magazine; and said means to identify said surface to a computer comprising indicia placed on pages of said book, said indicia which when transmitted by said scanner to said computer is matched to one of memory resident electronic renditions of said pages.

14. The surface scanning system of claim 5 additionally comprising:

said surface being one of a group of indica bearing surfaces including a book, a newspaper, and a magazine; and said means to identify said surface to a computer comprising indicia placed on pages of said book, said indicia which when transmitted by said scanner to said computer is matched to one of memory resident electronic renditions of said pages.

15. The surface scanning system of claim 6 additionally comprising:

said surface being one of a group of indica bearing surfaces including a book, a newspaper, and a magazine; and said means to identify said surface to a computer comprising indicia placed on pages of said book, said indicia which when transmitted by said scanner to said computer is matched to one of memory resident electronic renditions of said pages.

16. A method of surface scanning and providing feedback to a user based on specific points on a surface identified by the user through a scanner viewing said surface comprising:

placing an electronic copy of said surface in computer memory;

placing a means to identify said surface to said computer having said electronic copy of said surface stored in memory, on said surface;

having the user employ a means to identify a specific point on said surface wherein said specific point is communicated through said scanner to said computer;

employing software resident in said computer to compare said specific point identified to specific points on said electronic copy of said surface and thereby identify designated indicia located at said specific point; and employing said software thereafter to communicate communicating to said user, additional information relating to said designated indica, using an electronic means for output of said additional information to said user.

17. The surface scanning system of claim 1 additionally comprising:

said surface being one of a group of indica bearing surfaces including a template, a book, a newspaper, and a magazine said means to identify said surface to a computer comprising indicia placed on said surface, said indicia being words located in the corners of the words printed on the surface, wherein when transmitted by said scanner to said computer, a plurality of said words located in said corners, are matched to one of a plurality of memory resident electronic renditions of said surfaces for matching words in matching positions, thereby identifying said surface.

18. The surface scanning system of claim 2 additionally comprising:

said surface being one of a group of indica bearing surfaces including a template, a book, a newspaper, and a magazine said means to identify said surface to a computer comprising indicia placed on said surface, said indicia being words located in the corners of the words printed on the surface, wherein when transmitted by said scanner to said computer, a plurality of said words located in said corners, are matched to one of a plurality of memory resident electronic renditions of said surfaces for matching words in matching positions, thereby identifying said surface.

* * * * *